United States Patent [19]

DiSanto et al.

[11] Patent Number: 5,315,312
[45] Date of Patent: May 24, 1994

[54] ELECTROPHORETIC DISPLAY PANEL WITH TAPERED GRID INSULATORS AND ASSOCIATED METHODS

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 108,846

[22] Filed: Aug. 18, 1993

Related U.S. Application Data

[63] Continuation of Ser. No. 999,570, Dec. 30, 1992, abandoned, which is a continuation of Ser. No. 696,169, May 6, 1991, abandoned.

[51] Int. Cl.⁵ ............................................. G09G 3/34
[52] U.S. Cl. .................................... 345/107; 345/84; 313/505
[58] Field of Search ............... 345/107, 105, 106, 84; 359/291–297; 437/228, 235; 313/505

[56] References Cited

U.S. PATENT DOCUMENTS

| | | | |
|---|---|---|---|
| 3,612,758 | 10/1971 | Evans | 345/107 |
| 3,704,389 | 11/1972 | McClelland | 340/779 |
| 4,522,472 | 6/1985 | Liebert et al. | 340/716 |
| 4,655,897 | 4/1987 | DiSanto et al. | 359/296 |
| 4,742,345 | 5/1988 | Di Santo et al. | 340/783 |
| 4,766,426 | 8/1988 | Hatada et al. | 340/719 |
| 4,772,820 | 9/1988 | Di Santo et al. | 313/505 |
| 4,832,788 | 5/1989 | Hemirott | 437/235 |
| 5,066,615 | 11/1991 | Brady et al. | 437/228 |

*Primary Examiner*—Ulysses Weldon
*Assistant Examiner*—Regina Liang
*Attorney, Agent, or Firm*—Plevy & Associates

[57] ABSTRACT

A triode-type electrophoretic display includes a fluid-tight envelope for containing an electrophoretic fluid with suspended pigment particles and has a glass viewing window upon which has been deposited a plurality of parallel cathode members. A plurality of elongated insulator strips are interposed between and electrically insulate the cathode members from a plurality of parallel vertical grid members. Each of the strips support a corresponding grid member thereon a selected distance from the cathode members and tapers at a least one end such that the grid member is supported by the window at that end. The window provides a stable substrate for wire bonding the grid members to display driver circuitry.

24 Claims, 3 Drawing Sheets

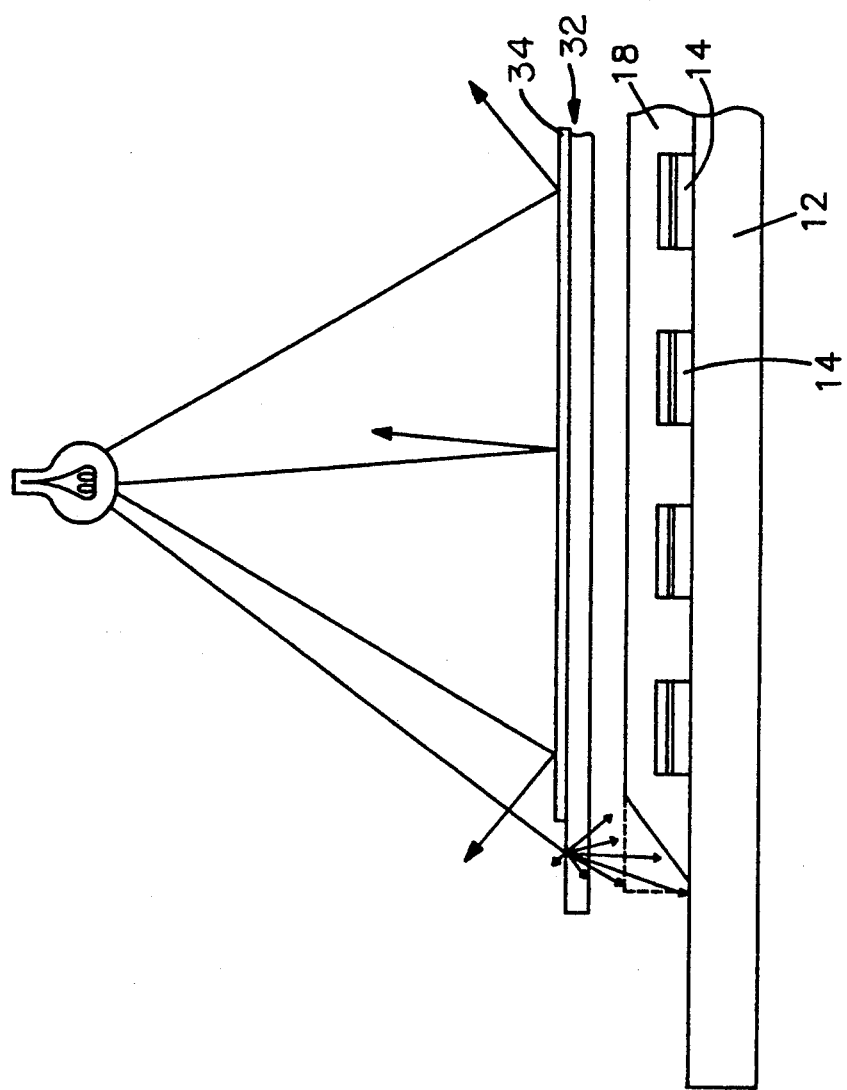

ELECTROPHORETIC DISPLAY PANEL WITH TAPERED GRID INSULATORS AND ASSOCIATED METHODS

This is a continuation of application Ser. No. 07/999,570, filed on Dec. 30, 1992, entitled ELECTROPHORETIC DISPLAY PANEL WITH TAPERED GRID INSULATORS AND ASSOCIATED METHODS, now abandoned, which is a continuation of prior application Ser. No. 07/696,169, filed on May 6, 1991, now abandoned.

FIELD OF THE INVENTION

The present invention relates to electrophoretic display panel apparatus and methods for fabricating same, and more particularly, to a triode-type electrophoretic display panel having an improved grid insulator configuration permitting more efficient electrical connection to display driver circuitry.

DESCRIPTION OF THE PRIOR ART

A variety of electrophoretic display panels are now known. Of most direct pertinence to the present invention are those shown and described in U.S. Pat. No. 4,655,897 entitled "Electrophoretic Display Panels and Associated Methods", U.S. Pat. No. 4,742,345, entitled "Electrophoretic Display Panel Apparatus and Methods Therefor", U.S. Pat. No. 4,772,820 entitled "Monolithic Flat Panel Display Apparatus" and U.S. Pat. application No. 667,630 entitled ELECTROPHORETIC DISPLAY PANEL WITH PLURAL ELECTRICALLY INDEPENDENT ANODE ELEMENTS, (CopyTele 3.0-17) filed on Mar. 11, 1991. Each of the foregoing U.S. Patents as well as the application referred to, is in the name of Frank J. DiSento and Denis A. Krusos, the inventors herein, and are assigned to the assignee herein, Copytele, Inc. The display panels shown in the foregoing patents and application operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic force and the charge on the pigment particles. The electrophoretic display apparatus taught in each of the foregoing U.S. Patents are triode type displays having a plurality of independent, parallel cathode conductor members deposited in the horizontal on one surface of a glass viewing screen. A layer of insulating photoresist material deposited over the cathode members and photoetched down to the cathode members to yield a plurality of insulator strips positioned at right angles to the cathode members, forms the substrate for a plurality of independent, parallel grid conductor members running in the vertical direction. A glass cap member forms a fluid-tight seal with the viewing window along the cap's peripheral edge for containing the fluid suspension and also acts as a substrate for the anode which is a conductor layer deposited on the interior flat surface of the cap. The term "cap" is used in its broadest sense as the cap member may include a glass sheet used as the anode with a peripheral seal joining the anode to the grid-cathode assembly. Such structure is seen in the above-noted patents. When the cap is in place, the anode surface is in spaced parallel relation to both the cathode members and the grid members. Given a specific particulate suspension, the sign of the electrostatic charge which will attract and repel the pigment particles will be known. The cathode member voltage and the grid member voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid members to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when a first voltage difference appears at a particular intersection point, then a sufficient electrostatic field will be present at the intersection to cause the writing of a visual bit of information on the display. The bit may be erased when a second state occurs. In this manner, digitized data can be displayed on the electrophoretic display.

The electrophoretic displays described above utilize numerous electrically and physically independent cathode and grid members. For example, an 8 ½×11" display screen with a resolution of 200 lines per inch has 2,200 horizontal cathode row members and 1,700 vertical column grid members. In general, it is desirable to have the greatest number of horizontal and vertical members with the smallest possible width. This results in increased resolution and screen brightness, i.e., the more coordinates, the greater the resolution, the smaller the width of each element, the less the electrophoretic effect is obscured. Thus, the electrophoretic display raises a technical challenge that is common in the field of densely-packed miniaturized electrical devices, viz., while it is possible, using photoetching techniques and the like, to create extremely small circuit components, it is sometimes difficult to make the numerous electrical connections necessary to integrate the miniature components, in this case, the cathode and grid members and the display drivers, into a circuit. A variety of techniques to facilitate connection of miniature components have been developed. For example, U.S. Pat. No. 4,772,820 teaches an improved means for connecting numerous miniature cathode and grid members to display drivers. In accordance with that patent, the ends of the cathode and grid members resident upon the surface of the glass viewing screen of the display are metalized and grouped into a pattern which is adapted to electrically connect to mating output contacts of a driver circuit that is bonded to the screen at a predetermined aligned location. The bonding of the respective mating contacts is performed using wire bonding techniques which can be automated to yield quick and efficient connections. In yet a further aspect of the '820 patent, the inputs to the driver circuit are also wire bonded to patterned input conductors provided on the surface of the screen, thus yielding a substantially monolithic display screen having integral associated driver circuits.

Both U.S. Pat. No. 4,742,345 and 4,772,820 utilize a grid comprised of numerous electrically and physically independent elements which supply the horizontal coordinate for each displayable location. The grid elements in the foregoing patents are spaced away from the cathode elements by an insulation layer.

U.S. Pat. No. 4,772,820 teaches that a connection between the grid elements on one plane and screen surface resident driver circuitry may be made by wire bonding, wherein a wire segment traverses the distance between, and is bonded at either end to, a grid element and a driver circuit terminal. This wire bonding technique is compromised, however, in that the photoresist layer underlying the grid elements is deformable under the pressure of the wire bonding machine and does not, therefore, make an optimal bond either in terms of strength of bond or ease of making it.

The Application cited above, on the other hand, sets forth an alternative display structure utilizing an electrically equipotential grid having only a single electrical connection and an anode with a plurality of discrete elements. While the device taught in the aforementioned application is certainly a solution to the connection problem, the present invention is directed to displays having a grid comprised of multiple discrete elements rather than a monolithic or monopotential grid.

It is therefore an object of the present invention to provide an electrophoretic display which provides an improved conductor pathway from the plane of the grid to that of the viewing screen whereon driver circuitry resides.

It is a further object to provide a stable base to expedite wirebonding of display elements to display circuitry.

It is yet another objective to provide an electrophoretic display which is easier and more economical to produce by simplifying the connection of the numerous vertical display elements to their respective driver circuits.

SUMMARY OF THE INVENTION

The problems and disadvantages associated with conventional electrophoretic displays are overcome by the present invention which includes a fluid-tight envelope for containing electrophoretic fluid and having a planar portion thereof which is at least partially transparent. The fluid has pigmented particles suspended therein. A plurality of elongated substantially parallel horizontal conductor members are deposited upon the planar portion and contained within the envelope, along with a plurality of elongated substantially parallel vertical conductor members. A plurality of elongated insulator strips are interposed between and electrically insulate the horizontal members from the vertical members, the strips being affixed to both. Each of the strips support a corresponding vertical member thereon a selected distance from the horizontal members and tapers at least one end thereof such that the vertical member contacts the planar portion proximate the tapered end. The horizontal and vertical members form a matrix with a plurality of intersections, each of the members being selectively electrically chargeable to induce movement of the particles within the fluid. The particles are at least partially visible through the planar portion of the envelope.

BRIEF DESCRIPTION OF THE FIGURES

For a better understanding of the present invention, reference is made to the following detailed description of an exemplary embodiment considered in conjunction with the accompanying drawings, in which:

FIG. 5 is a diagrammatic depiction of a step in the photoetching operation utilizing the mask shown in FIG. 4 to form the tapering grid insulator shown in FIG. 2.

DETAILED DESCRIPTION OF THE FIGURES

Figure 1:
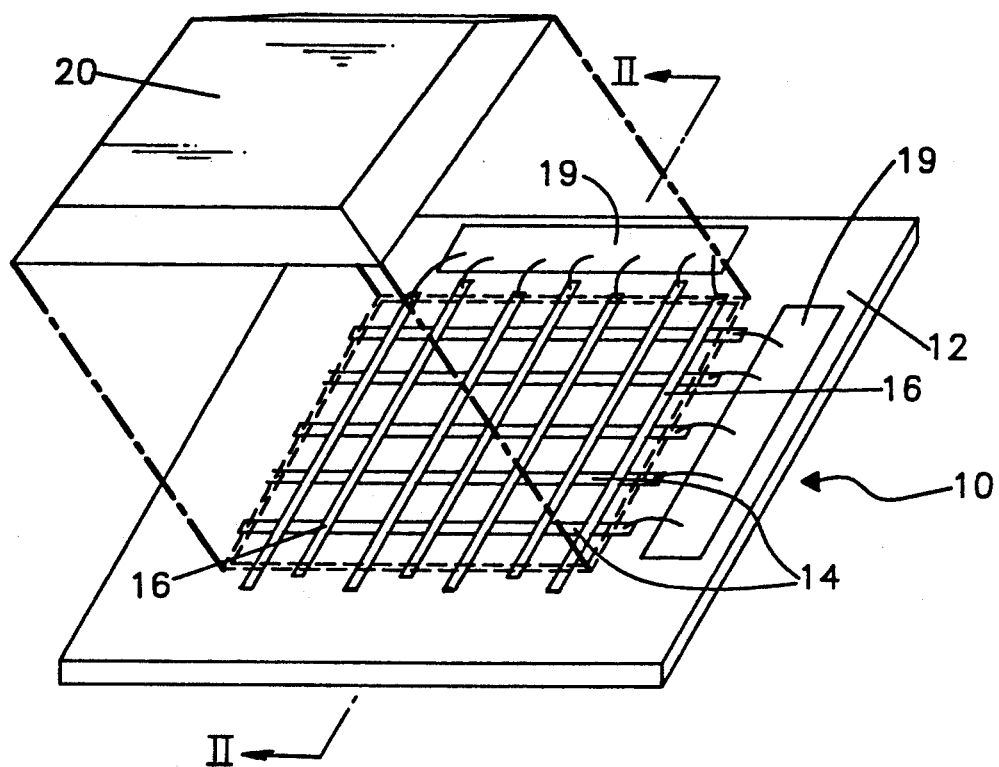
FIG. 1 is an exploded perspective view of a triode-type electrophoretic display in accordance with an exemplary embodiment of the present invention.

FIG. 1 shows the rear side of an electrophoretic display panel 10 as exemplified, e.g., by U.S. Pat. No. 4,742,345 to Di Santo et al., this patent being incorporated herein by reference for showing the general construction and components of an electrophoretic display panel. The panel 10 includes a faceplate 12, typically formed from glass, which serves as a substrate upon which is deposited a plurality of independent, electrically conductive cathode members 14 (horizontal rows) using conventional deposition and etching techniques. It is preferred that the cathode members 14 be composed of Indium Tin Oxide (ITO) as set forth in U.S. Pat. No. 4,742,345. A plurality of independent grid conductor members 16 are superimposed in the horizontal over the cathode members 14 and are insulated therefrom by an interstitial photoresist layer 18 (see FIG. 2). The grid members 16 may be formed by coating the photoresist layer 18 with a metal, such as nickel, using sputtering techniques or the like and then selectively masking and etching to yield the intersecting but insulated configuration shown in FIGS. 1 and 2. Each cathode and grid member 14, 16 terminates at one end in a contact pad or is otherwise adapted to permit connection to display driver circuitry figuratively depicted as reference no. 19, as shall be more fully described below. In the embodiment shown, the representative driver circuit 19 is bonded to the faceplate 12 in accordance with the teachings of U.S. Pat. No. 4,772,820, which is incorporated herein by reference. An actual display would utilize numerous such circuits as described in U.S. Pat. No. 4,772,820. An anode cap 20 is sealably affixed to the faceplate 12 and over the cathode and grid members 14 and 16 to form an envelope for containing the dielectric fluid/pigment particle suspension. The anode cap 20 is formed from an insulating material, such as glass, and has an inner surface coating of conductor material to form the anode. Thus, by applying voltages to the cathode and grid members 14 and 16 and the anode 20, suspended pigment particles in the dielectric fluid can be made to accumulate near, or disperse from, the intersections of selected cathode and grid members 14 and 16 to translate these voltages into a visible display.

The discrete cathode and grid members 14 and 16 of the electrophoretic display 10 can assume a variety of voltages during operation for controlling the display operations of erase, hold and write at the numerous points of intersection defining a cathode/grid matrix. A workable panel would have a large number of intersections, e.g., 2,200 ×1,700 or a total of 3,740,000 separately addressable intersection points. For ease of illustration, however, a small set of discrete cathode and grid elements are shown in the figures. The dimensions of the respective elements have also been greatly enlarged for illustration and are not necessarily in proportion to an actual operational device. More verisimilar illustrations of electrophoretic displays, their components and electrical circuitry can be seen by referring to U.S. Pat. Nos. 4,742,345 and 4,772,820, each being awarded to the inventors herein and which are incorporated by reference herein.

Figure 2:
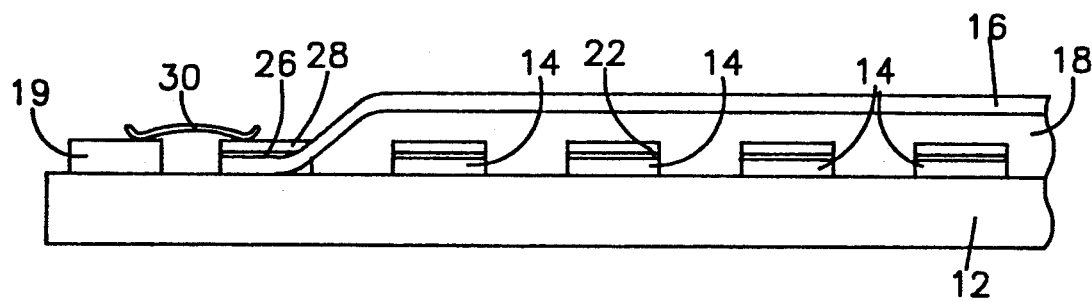
FIG. 2 is a fragmental cross-sectional view of the faceplate portion of the device shown in FIG. 1 taken along section line II—II and looking in the direction of the arrows.

FIG. 2 shows the faceplate 12 of the electrophoretic display 10 of FIG. 1 in cross-section. The faceplate is preferably formed from glass and serves as a substrate upon which is deposited a plurality of independent electrically conductive cathode members 14. The layer of photoresist 18 insulates a plurality of grid elements 16 from the cathode elements. The photoresist 18 is etched down to the cathode members 14 to form strips of insulator which underlie the separate grid elements 16 by an operation set forth fully in U.S. Pat. No. 4,742,345. In this view, four cathode elements 14 are visible and only a single grid element 16 is depicted. In order to facilitate connection of the cathode 14 and grid 16 elements of the display to display driver circuitry 19, the ends of the cathode members 14 are metalized, or coated with a metal or metals, in preparation for connection. FIG. 2 shows two metal layers 14 and 22. The first 14 is an ITO layer, and the second 22, a wire bonding layer of, e.g., chrome or aluminum. The grid members 16 are formed of a wire bonding metal, e.g., chrome or aluminum. A wire loop 30 electrically connects the grid element 16 to the device driver circuitry 19.

Figure 3:
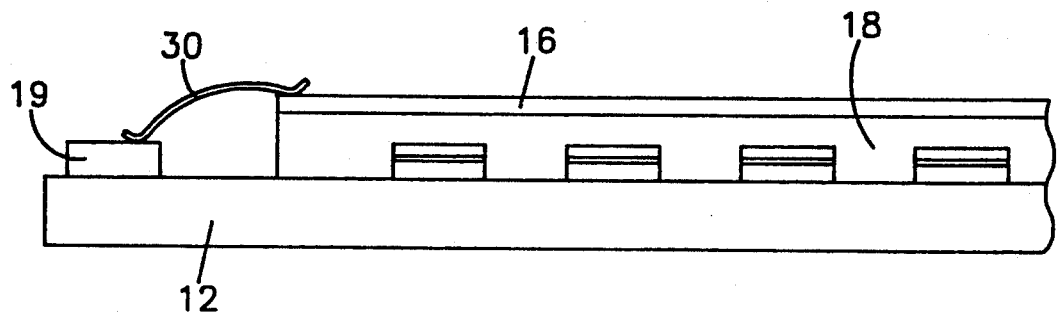
FIG. 3 is a fragmental cross-sectional view of a faceplate like that shown in FIG. 2, but in accordance with a prior configuration as shown, e.g., in U.S. Pat. No. 4,772,820.

An inventive aspect of the present invention can be appreciated by comparing the insulator 18 and grid 16 configuration shown in FIG. 2 with that shown in FIG. 3 which depicts a photoresist layer 18 shape as was taught, e.g., in U.S. Pat. No. 4,772,820. In FIG. 3, the insulator layer 18 comes to an abrupt end coterminal with the grid element 16. This results in a grid contact which is spaced an appreciable distance from the faceplate 12 and the device driver circuitry 19. Further, the grid element 16 is supported at the contact end by insulating photoresist material 18, which is deformable. When bonding is performed, the pressure exerted by the bonding machine to assist in affixing the wire loop 30 to the grid 16 is absorbed by a deformation of the insulator layer 18. Thus the bond is compromised and the process may have to be repeated by the bonding machine operator. Upon reexamining FIG. 2, it can be appreciated that the insulating photoresist layer 18 shown therein is sloped to permit the grid member 16 to descend from a plane above the faceplate 12 to the faceplate itself. This allows the contact end of the grid element 16 to reside on the hard glass of the faceplate 12, assuring a firm support for the contact when subjected to the pressure of the bonding machine and a good bond.

Figure 4:
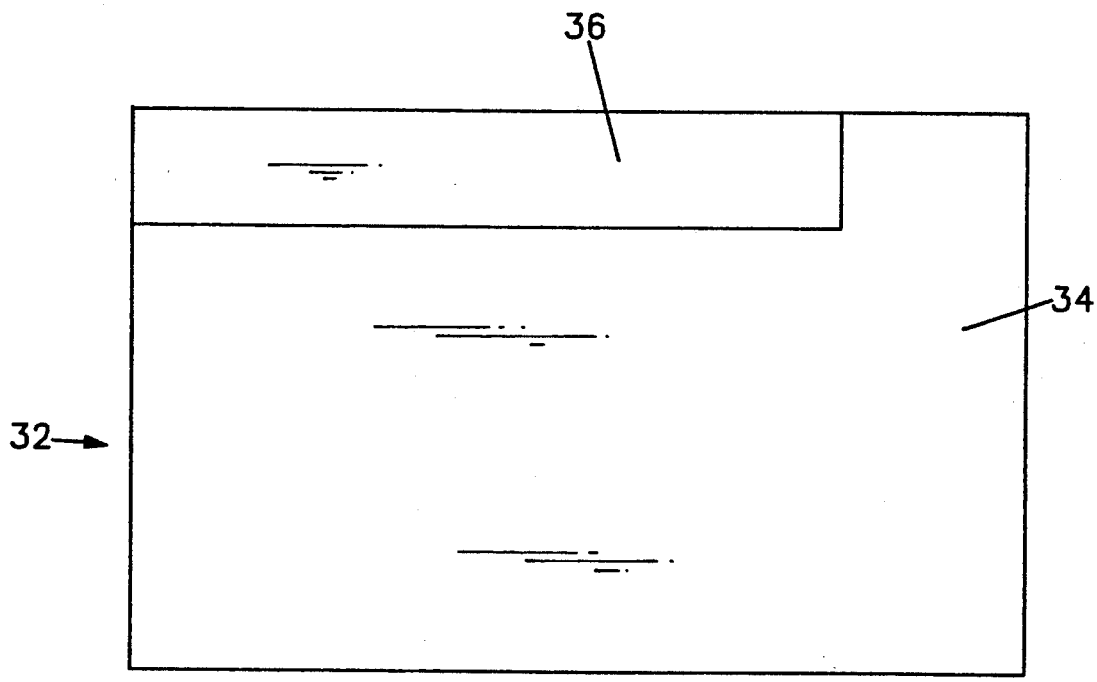
FIG. 4 is a plan view of a mask for effecting the tapering grid insulator shown in FIG. 2.

FIG. 4 shows a representative mask 32 which could be employed to create the tapered insulation layer 18 discussed above and shown in FIG. 2. The mask 32 is preferably made from glass and has one side partially coated with a reflective coating 34, e.g., chromium. The mask 32 shown is left uncoated along a portion 36 of one edge and in this area is clear. The clear portion 36 of the mask 32 will be positioned over that area of insulator 18 that is to be sloped down to the faceplate 12. The positioning of the mask 32 during the exposure of the photoresist 18 can be more easily visualized by examining FIG. 5.

FIG. 5 illustrates the selective and graduated removal of photoresist insulator 18 along one edge, by light exposure. Prior to performing the light exposure step illustrated, ITO cathode members 14 are formed on the faceplate 12 at described above. The photoresist insulator layer 18 is then applied by spin coating to a thickness of, e.g. 3.5 to 4.0 microns. If Shipley #1400-33 photoresist, manufactured by the Shipley Company, Inc. of Newton, Mass. is employed, a spinning rate of around 1,500 RPM will provide this thickness. This type of photoresist material is positive acting, i.e., that which is exposed to light is subject to removal by developer. The photoresist covered faceplate 12 is then prebaked at 95 degrees Centigrade for 30 minutes. The coated faceplate 12 and mask 32 are then placed in a light exposure chamber. The mask 32 is positioned between the coated faceplate and light source at a distance therefrom to produce a graduated light intensity at a selected edge of the photoresist to render a sloping edge on the resist. The reflective coating 34 of the mask 32 points upwards towards the light and the clear portion 36 is positioned proximate the resist 18 that is to be removed and/or tapered. Upon exposure to light, those areas of photoresist 18 which are exposed to the strongest flux will be removed in their entirety and those areas having minimal exposure will be only slightly effected. At the edge of the reflective portion 34 of the mask 32, the light rays are refracted and dispersed upon passage through the clear portion 36. A range of light intensities is therefore produced upon the exposed resist 18, depending upon its position relative to the edge of the reflective layer 34. This situation is depicted in FIG. 5 by the vectors generated from a single ray of incident light passing through the clear area 36 proximate the reflective coating 34 edge. After the resist 18 is exposed, it is developed by developer. In order to provide a suitable substrate for depositing grid metal, the structure produced in the preceding steps must be thoroughly washed, especially in the area where resist has been removed. One method of accomplishing this is by rinsing the piece thoroughly in deionized water. The piece is then plasma etched in oxygen sufficiently to remove about 1,500 Angstroms from the surface. In a plasma etching machine, such as a Magastrip G ® manufactured by Drytek Co. of Wilmington, Mass., modified for parallel plate etching, a time of one minute at a chamber pressure of 100 microns per square centimeter, a flow rate of 10 cubic centimeters per minute and a power density of about 1.6 watts per square centimeter is sufficient. The piece is then placed in an oven and baked at temperatures ramping up to 180 degrees Centigrade at 3 degrees Centigrade per minute. It is then baked at 180 degrees Centigrade for 90 minutes. The foregoing process yields a clean, flat photoresist insulator layer having a sloping edge where it was exposed to light through the clear portion of the mask. The individual grid members 16 are then formed on top of this layer by first sputtering on a layer of chrome or other suitable metal, such as nickel, about 3000 Angstroms thick. The chrome layer is covered by a layer of photoresist which is masked, exposed and developed and so on, all as described in U.S. Pat. No. 4,742,345 pertaining to the formation of the individual grid elements. Thus, the insulation layer 18, having a configuration as shown in FIG. 2 is formed, permitting wire bonding to grid elements 16 that are supported at their contact end by the glass faceplate 12 rather than a photoresist layer 18.

It should be understood that the embodiments described herein are merely exemplary and that a person skilled in the art may make many variations and modifications without departing from the spirit and scope of the invention as defined in the appended claims.

We claim:

1. An electrophoretic display comprising:
   (a) a fluid tight envelope having a planar portion thereof which is at least partially transparent;
   (b) an electrophoretic fluid contained within said envelope, said fluid having pigmented particles suspended therein;
   (c) a plurality of elongated substantially parallel cathode conductor members deposited upon said planar portion and contained within said envelope;
   (d) a plurality of elongated substantially parallel grid conductor members contained within said envelope, said grid conductor members and said cathode conductor members defining a matrix with a plurality of intersections, and said grid and cathode conductor members being selectively electrically chargeable to induce movement of said particles within said fluid; and
   (e) a plurality of elongated grid insulator strips interposed between and electrically insulating said cathode conductor members from said grid conductor members, each of said strips separating a respective grid conductor member from a corresponding cathode conductor member by a selected distance, each of said strips having a substantially planar top surface extending parallel to a base surface and an edge surface sloping downwardly from said top surface to said base surface, wherein said base surface is supported by said planar portion and a continuous surface portion of each grid conductor member is in contact with and supported by both said downwardly sloping edge surface and said planar portion.

2. The device of claim 1, wherein said envelope includes a cap member having an end wall and side walls, said side walls defining a hollow within said cap member, said end wall coated with a conductor layer selectively chargeable to induce movement of said pigment particles, said side walls sealably affixed to said planar portion to form said fluid-tight envelope.

3. The device of claim 2, wherein said electrophoretic display is a triode-type device, said conductor layer being the anode.

4. The device of claim 3, wherein said planar portion is a glass faceplate having a surface area larger than that covered by said cap, such that a border area of said faceplate extends beyond said cap and said fluid.

5. The device of claim 4, wherein each of said plurality of cathode conductor members and each of said plurality of grid conductor members have an end electrically connectable to an associated voltage source, said connectable end extending beyond said cap and said fluid.

6. The device of, claim 5, further including display driver circuitry affixed to said faceplate on said border area, said circuitry connecting to said connectable ends of said grid conductor members and said cathode conductor members.

7. The device of claim 6, wherein said connectable ends are wire bonded to said display driver circuitry.

8. The device of claim 7, wherein all said connectable ends are supported by said glass faceplate.

9. The device of claim 8, wherein said connectable ends of said cathode conductor members are metalized.

10. The device of claim 9, wherein said connectable ends of said grid conductor members are metalized.

11. The device of claim 10, wherein said insulator strips are photoresist.

12. A method for making an electrophoretic display having a glass faceplate with a plurality of elongated substantially parallel horizontal conductor members deposited thereon, a plurality of elongated substantially parallel vertical conductor members, and a plurality of elongated insulator strips interposed between and electrically insulating said horizontal members from said vertical members, said strips affixed to said horizontal members and to said vertical members and each of said strips supporting a corresponding vertical member thereon a selected distance from said horizontal members and having a substantially planar top surface extending parallel to a base surface and an edge surface sloping downwardly from said top surface to said base surface, wherein said base surface is supported by said planar portion and a continuous surface portion of each vertical conductor member is in contact with and supported by said downwardly sloping edge surface and by said faceplate, comprising the steps of:
   (a) forming said horizontal members upon a surface of said faceplate;
   (b) applying a layer of photoresist to said surface;
   (c) exposing said layer to light;
   (d) simultaneously with said step of exposing, controlling the areas of said layer exposed to light with a mask, said mask having a portion thereof which partially and graduatedly shades a selected area of photoresist to produce said downwardly sloping edge surface thereon when developed;
   (e) developing said exposed photoresist;
   (f) applying layer of conductor material on said developed photoresist; and
   (g) etching said conductor material and said underlying photoresist to form said vertical members and said insulator strips such that a continuous portion of each vertical member is disposed on said downwardly sloping edge surface defined by each of said corresponding insulator strips and on said faceplate.

13. The method of claim 12, wherein said mask is formed from a transparent material partially coated with an opaque substance leaving a portion of said mask transparent to light and wherein said opaque coating is positioned toward the light during said simultaneous steps of exposing and controlling.

14. The method of claim 13, wherein said mask is positioned relative to said light and said photoresist such that light passing through said transparent portion of said mask proximate said opaque coating is transmitted through said mask with a graduated flux intensity ranging from approximately zero to full luminous intensity, the intensity increasing with increasing distance from said opaque portion.

15. The method of claim 14, wherein said graduated flux intensity is attributable to refraction and diffusion of light within said transparent portion of said mask.

16. The method of claim 12, wherein said layer of photoresist is applied by spin coating and further including the step of prebaking said faceplate and said photoresist after said step of applying said layer of photoresist.

17. The method of claim 16 wherein said spin coating is performed at a spinning rate of approximately 1,500 RPM and said layer has a thickness of approximately 3.5 to 4.0 microns.

18. The method of claim 16, wherein said step of prebaking is at approximately 95 degrees Centigrade for approximately 30 minutes.

19. The method of claim 12, further including the steps of washing and oxygen plasma etching said developed photoresist prior to said step of applying said layer of conductor material.

20. The method of claim 19, wherein said step of washing is in deionized water and said step of plasma etching is performed for approximately 1 minute at a chamber pressure of about 100 microns per square centimeter, a flow rate of approximately 10 centimeters$^3$ per minute and a power density of about 1.6 watts per centimeter$^2$.

21. The method of claim 19, further including the step of baking said faceplate and said photoresist after said step of plasma etching.

22. The method of claim 21, wherein said baking is at a temperature ramping up from room temperature to a temperature of about 180 degrees Centigrade at a ramping rate of 3 degrees Centigrade per minute, then baking at 180 degrees Centigrade for 90 minutes.

23. The method of claim 14, wherein said layer of photoresist is applied by spin coating, and further including the steps of prebaking said faceplate and said photoresist after said step of applying said layer of photoresist, washing and oxygen plasma etching said developed photoresist prior to said step of applying said layer of conductor material, and baking said faceplate and said photoresist after said step of plasma etching.

24. The method of claim 23, wherein said spin coating is performed at a spinning rate of approximately 1,500 RPM and said layer of photoresist has a thickness of approximately 3.5 to 4.0 microns, wherein said step of prebaking is at approximately 95 degrees Centigrade for approximately 30 minutes, wherein said step of washing is in deionized water, wherein said step of plasma etching is performed for approximately 1 minute at a chamber pressure of about 100 microns per square centimeter, a flow rate of approximately 10 centimeters$^3$ and a power density of about 1.6 watts per centimeter$^2$, and wherein said baking is at a temperature ramping up from room temperature to a temperature of about 180 degrees Centigrade at a ramping rate of 3 degrees Centigrade per minute, then baking at 180 degrees Centigrade for 90 minutes.

* * * * *